(12) United States Patent
Minami et al.

(10) Patent No.: US 7,659,034 B2
(45) Date of Patent: Feb. 9, 2010

(54) LITHIUM SECONDARY BATTERY

(75) Inventors: Hiroshi Minami, Tokushima (JP);
Hiromasa Yagi, Nishinomiya (JP);
Katsunobu Sayama, Kobe (JP); Maruo Kamino, Tokushima (JP)

(73) Assignee: SANYO Electric Co., Ltd., Osaka (JP)

( * ) Notice: Subject to any disclaimer, the term of this patent is extended or adjusted under 35 U.S.C. 154(b) by 874 days.

(21) Appl. No.: 10/992,081

(22) Filed: Nov. 19, 2004

(65) Prior Publication Data

US 2005/0106465 A1  May 19, 2005

(30) Foreign Application Priority Data

Nov. 19, 2003  (JP) ............................. 2003-389847

(51) Int. Cl.
*H01M 4/58* (2006.01)
*H01M 2/26* (2006.01)
*H01M 2/28* (2006.01)
*H01M 6/16* (2006.01)

(52) U.S. Cl. .................. 429/231.95; 429/330; 429/338; 429/231.1; 429/231.9

(58) Field of Classification Search ........................ None
See application file for complete search history.

(56) References Cited

U.S. PATENT DOCUMENTS

| | | | |
|---|---|---|---|
| 6,685,804 B1 * | 2/2004 | Ikeda et al. | 204/192.12 |
| 2004/0005265 A1 * | 1/2004 | Chiang et al. | 423/306 |
| 2004/0018430 A1 | 1/2004 | Holman et al. | 429/233 |
| 2004/0096742 A1 * | 5/2004 | Akashi et al. | 429/223 |
| 2004/0234853 A1 * | 11/2004 | Adachi et al. | 429/231.1 |

FOREIGN PATENT DOCUMENTS

WO  01/29913 A1  4/2001

OTHER PUBLICATIONS

Periodic Table by Scintag.*

* cited by examiner

*Primary Examiner*—Patrick Ryan
*Assistant Examiner*—Angela J. Martin
(74) *Attorney, Agent, or Firm*—Kubovcik & Kubovcik

(57) ABSTRACT

Charge-discharge cycle performance is improved in a lithium secondary battery including a negative electrode containing a negative electrode active material having silicon as its main component, provided on a surface of a current collector, a positive electrode containing a positive electrode active material, and a non-aqueous electrolyte. The positive electrode active material is a lithium transition metal oxide containing Li and Co and having a layered structure, and further containing a group IVA element of the periodic table, such as Zr, Ti, or Tf, and a group IIA element of the periodic table, such as Mg.

14 Claims, No Drawings

LITHIUM SECONDARY BATTERY

BACKGROUND OF THE INVENTION

1. Field of the Invention

The present invention relates to lithium secondary batteries.

2. Description of Related Art

Lithium secondary batteries using a non-aqueous electrolyte and performing a charge-discharge operation by shifting lithium ions between positive and negative electrodes have been utilized in recent years as a new type of high power, high energy density secondary battery.

As for electrodes for such lithium secondary batteries, some research has been conducted on electrodes that use a material capable of alloying with lithium as its negative electrode active material. One example of the material capable of alloying with lithium that has been studied is silicon. However, a problem with a material capable of alloying with lithium such as silicon has been that the active material expands and shrinks when it intercalates (absorbs) and deintercalates (desorbs) lithium, causing the active material to pulverize or peel off from the current collector as the charge-discharge process is repeated. As a consequence, the current collection performance in the electrode reduces, degrading the battery's charge-discharge cycle performance.

The present applicant has found that an electrode formed by depositing on a current collector an active material thin film that intercalates and deintercalates lithium, such as an amorphous silicon thin film or a microcrystalline silicon thin film, shows high charge-discharge capacity and excellent charge-discharge cycle performance. (See International Publication WO 01/29913).

In this type of electrode, the active material thin film is divided into columnar structures by gaps formed along its thickness, and bottom portions of the columnar structures are in close contact with the current collector. In the electrode with such a structure, spaces form around the columnar structures. These spaces alleviate stress caused by the expansion and shrinkage of the thin film associated with charge-discharge cycles and prevent the occurrence of stress that causes the active material thin film to peel off from the current collector. Therefore, such an electrode can attain excellent charge-discharge cycle performance.

It is believed, however, that because of the electrode structure in which the negative electrode active material thin film is divided into columnar structures by gaps that form along its thickness, the above-noted electrode has a large surface area of the active material that comes into contact with the electrolyte solution, which can accelerate a decomposition reaction of the electrolyte solution. It is believed that, consequently, a larger amount of reaction product forms on the electrode surface than that formed on the surface of a negative electrode composed of a carbon material, which is commonly used at present, and the product diffuses through the electrolyte solution toward the positive electrode side and consequently promotes degradation of the positive electrode. As a result, due to the degradation of the positive electrode active material, the battery's charge-discharge cycle performance deteriorates.

BRIEF SUMMARY OF THE INVENTION

Accordingly, it is an object of the present invention to provide a lithium secondary battery that uses a negative electrode active material having silicon as its main component, and that is capable of improving the charge-discharge cycle performance.

In order to accomplish the foregoing and other objects, the present invention provides a lithium secondary battery comprising: a negative electrode containing a negative electrode active material having silicon as its main component, provided on a surface of a current collector, a positive electrode containing a positive electrode active material, and a non-aqueous electrolyte, the positive electrode active material being a lithium transition metal oxide containing Li and Co and having a layered structure, and further containing a group IVA element and a group IIA element of the periodic table.

In the present invention, a group IVA element and a group IIA element of the periodic table are added to the lithium transition metal oxide containing Li and Co and having a layered structure. This makes it possible to reduce adverse effects on the positive electrode active material that are caused by a reaction product formed on the negative electrode surface and to greatly improve the charge-discharge cycle performance.

Specific examples of the group IVA element of the periodic table include Ti, Zr, and Hf. Among them, Zr is especially preferable. Specific examples of the group IIA element of the periodic table include Be, Mg, Ca, Sr, Ba, and Ra. Among them, Mg, Ca, Sr, and Ba are preferable, and Mg is especially preferable.

In the present invention, a preferable example of the lithium transition metal oxide containing Li and Co and having a layered structure is lithium cobalt oxide. Thus, a positive electrode active material preferably used in the present invention is that in which a group IVA element and a group IIA element of the periodic table are added to lithium cobalt oxide.

In the present invention, it is preferable that the total content of the group IVA element and the group IIA element of the periodic table be 3 mole % or less in the positive electrode active material with respect to the total of the just-noted elements and the transition metal in the lithium transition metal oxide. If the amount of the group IVA element and the group IIA element is too large, the charge-discharge characteristics may degrade. In addition, it is preferable that the lower limit of the total content of the group IVA element and the group IIA element be 0.5 mole % or greater. If the total content of these elements is too small, improvement in the charge-discharge cycle performance, which is an advantageous effect of the present invention, may not be attained sufficiently.

When the positive electrode active material in the present invention is that in which a group IVA element M and a group IIA element N are added to lithium cobalt oxide, an example of the positive electrode active material of the present invention can be a compound represented by the general formula $Li_aM_xN_yCo_zO_2$ wherein $0<a\leq1.1$, $x>0$, $y>0$, $0.97\leq z\leq1.0$, and $0<x+y\leq0.03$. Here, the total content of the group IVA element and the group IIA element is 3 mole % or less. When the content is in a preferable range of 0.5-3 mole % as described above, x+y satisfies the equation $0.005\leq x+y\leq0.03$.

Further, in the present invention, it is preferable that the positive electrode active material contain the group IVA element and the group IIA element in substantially equimolar amounts. The term "substantially equimolar amounts" herein means that x and y in the foregoing general formula satisfy the following equations:

$$0.45\leq x/(x+y)\leq0.55, \text{ and}$$

$$0.45\leq y/(x+y)\leq0.55.$$

That is, x/y satisfies the following equation:

$$(0.45/0.55=)0.82\leq x/y\leq1.2(=0.55/0.45).$$

Since the group IVA element and the group IIA element are contained in substantially equimolar amounts, advantageous effects of the present invention can be sufficiently attained.

The negative electrode in the present invention is an electrode in which a negative electrode active material having silicon as its main component is provided on a surface of the current collector. Examples of such an electrode include an electrode formed by depositing an active material thin film having silicon as its main component on a surface of a current collector, and an electrode formed by making particles having silicon as their main component, such as silicon particles, into a slurry together with a binder and coating the slurry on a current collector, followed by drying.

The electrode formed by depositing an active material thin film having silicon as its main component on a surface of a current collector is used especially preferably in the present invention. In such a thin film, gaps are formed along its thickness because of the expansion and shrinkage of the active material thin film originating from the charge-discharge reaction, and by these gaps the thin film is divided into columnar structures. It is believed that, consequently, the surface area of the active material that comes into contact with the electrolyte solution increases as the charge-discharge reaction proceeds, promoting decomposition reaction of the electrolyte solution. It is believed that, consequently, as compared with the use of a carbon negative electrode, which is commonly used at present as a negative electrode for a lithium secondary battery, a larger amount of reaction product forms on the electrode surface than that formed on the surface of the carbon negative electrode. It is thought that the reaction product on the negative electrode surface diffuses through the electrolyte solution toward the positive electrode and consequently promotes degradation of the positive electrode active material. By using the positive electrode active material according to the present invention, the adverse effects that the reaction product formed on the negative electrode surface causes on the positive electrode active material can be alleviated, and the battery's charge-discharge cycle performance can be remarkably improved.

Due to the gaps formed along the thickness of the thin film, spaces exist around the columnar structures in the electrode in which the thin film is divided into columnar structures. These spaces absorb the change in the volume of the thin film even when the thin film expands and shrinks because of the charge-discharge process, precluding the occurrence of stress in the thin film. Therefore, the thin film is prevented from pulverizing and peeling off from the current collector, and the battery's charge-discharge cycle performance can be enhanced.

In the present invention, an example of the active material having silicon as its main component includes that containing 50 atom % or more of silicon. Specific examples include elemental silicon and silicon alloys. Examples of silicon alloys include Si—Co alloy, Si—Fe alloy, Si—Zn alloy, and Si—Zr alloy. A Si—Co alloy is especially preferred because it improves the performance of the negative electrode active material and enhances the effect of reducing the degradation of the positive electrode.

With the active material used in the present invention, its volume expands when it intercalates lithium, and its volume shrinks when it releases the lithium that has been intercalated, as described above. Because of such expansion and shrinkage of the volume, the gaps are formed in the active material thin film, as described above. In particular, the gaps are easily formed when the active material thin film is formed by depositing it on a current collector having large irregularities in its surface.

That is, when the active material thin film is formed by depositing it on a current collector having large irregularities in the surface, it is possible to form irregularities corresponding to the irregularities in the surface of the current collector, which is a base layer, also on the surface of the active material thin film. In the regions that join the valleys of the irregularities in the thin film and the valleys of the irregularities in the surface of the current collector, low-density regions tend to form. Consequently, gaps are formed along such low-density regions, and thus, gaps are produced along the thickness.

In the present invention, it is preferable that large irregularities are formed in the surface of the current collector, as discussed above. Accordingly, it is preferable that the surface of the current collector be roughened. It is preferable that the arithmetical mean roughness Ra of the current collector surface be 0.1 μm or greater, and more preferably, be in the range of 0.1-10 μm. Arithmetical mean roughness Ra is defined in Japanese Industrial Standard (JIS) B 0601-1994. Arithmetical mean roughness Ra can be measured by, for example, a surface roughness meter.

Examples of a method for roughening the surface of the current collector include plating, etching, and polishing. Plating is a technique for roughening the surface by forming a thin film layer having irregularities in its surface on a current collector made of a metal foil. Examples of plating include electroplating and electroless plating. Examples of etching include techniques by physical etching and chemical etching. Examples of polishing include polishing using a sandpaper and polishing by blasting.

In the present invention, the current collector should preferably be formed of a conductive metal foil. Examples of the conductive metal foil include a foil of a metal such as copper, nickel, iron, titanium, and cobalt, or a foil of an alloy made of combinations of the metals. Particularly preferable is that containing a metal element that easily diffuses into the source material of the active material. Examples thereof include metal foils containing elemental copper, especially a copper foil or a copper alloy foil. It is preferable that a heat-resistant copper alloy foil be used as the copper alloy foil. Herein, the term "heat-resistant copper alloy" means a copper alloy that has a tensile strength of 300 MPa or greater after having been annealed at 200° C. for 1 hour. Examples of such heat-resistant copper alloys include zirconium copper, copper-tin, and phosphor bronze. Particularly preferable as the current collector is that provided with a copper layer or a copper alloy layer on such a heat-resistant copper alloy foil by an electrolytic process to increase the arithmetical mean roughness Ra.

In the present invention it is preferable that the active material is amorphous or microcrystalline. Accordingly, it is preferable that the active material thin film be an amorphous silicon thin film or a microcrystalline silicon thin film when the active material thin film is a silicon thin film.

In the present invention, when the negative electrode is formed by depositing a negative electrode active material on a current collector, it is preferable that the deposition is carried out by CVD, sputtering, evaporation, or plating.

In the present invention, the solute of the non-aqueous electrolyte may be any lithium salt that is generally used as a solute in lithium secondary batteries. Examples of such a lithium salt include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, and mixtures thereof.

The solvent of the non-aqueous electrolyte used in the present invention may be any solvent that has conventionally been used as a solvent for an electrolyte in lithium secondary batteries. Specifically, a cyclic carbonate or a chain carbonate is preferably used. Examples of the cyclic carbonate include ethylene carbonate, propylene carbonate, butylene carbonate, and vinylene carbonate. Among them, ethylene carbonate is especially preferable. Examples of the chain carbonate include dimethyl carbonate, methylethyl carbonate, and diethyl carbonate. Moreover, a mixed solvent in which two or more kinds of solvents are mixed is preferable as the solvent. In particular, it is preferable that the mixed solvent contain a cyclic carbonate and a chain carbonate.

Also preferably used is a mixed solvent of one of the above-mentioned cyclic carbonates and an ether-based solvent such as 1,2-dimethoxyethane or 1,2-diethoxyethane.

Usable electrolytes in the present invention include gelled polymer electrolytes in which an electrolyte solution is impregnated in a polymer electrolyte such as polyethylene oxide or polyacrylonitrile, and inorganic solid electrolytes such as LiI and $Li_3N$.

It is preferable that carbon dioxide be dissolved in the non-aqueous electrolyte in the present invention. It is believed that the use of the non-aqueous electrolyte in which carbon dioxide is dissolved causes a benign reaction product originating from the carbon dioxide to form on the surface of the negative electrode having silicon as its main component, and the reaction product forms a coating film on the negative electrode surface, tending to prevent adverse effects through the electrolyte solution toward the positive electrode side and precluding the positive electrode from degrading. By dissolving carbon dioxide in the non-aqueous electrolyte, the battery's charge-discharge cycle performance can be dramatically improved. It is preferable that the dissolved amount (dissolved content) of carbon dioxide in the non-aqueous electrolyte be 0.01 weight % or greater, and more preferably 0.05 weight % or greater.

According to the present invention, charge-discharge cycle performance is improved in a lithium secondary battery using a negative electrode active material containing silicon as its main component.

DETAILED DESCRIPTION OF THE PREFERRED EMBODIMENTS

Hereinbelow, preferred embodiments of the present invention are described by way of examples thereof. It should be understood, however, that the present invention is not limited to the following examples but various changes and modifications are possible within the scope of the invention.

Experiment 1

Preparation of Negative Electrode A

Copper was precipitated on a surface of a rolled foil of zirconium copper alloy (zirconium concentration: 0.03 weight %) by an electrolytic process to roughen the surface. The resulting copper alloy foil (arithmetical mean roughness Ra: 0.25 μm, thickness: 26 μm) was used as a current collector. On this current collector, an amorphous silicon thin film was deposited under the conditions set forth in Table 1 to prepare an electrode. Although direct current pulses were supplied as electric power for sputtering herein, it is also possible to carry out the sputtering under similar conditions even with the use of direct current or high frequency. Note that in Table 1 the unit sccm, denoting the flow rate, is an abbreviation of standard cubic centimeters per minute.

TABLE 1

| DC pulse frequency | 100 kHz |
| DC pulse width | 1856 ns |

TABLE 1-continued

| DC pulse power | 2000 W |
| Argon flow rate | 60 sccm |
| Gas pressure | $2.0\text{-}2.5 \times 10^{-1}$ Pa |
| Formation duration | 146 minutes |
| Film thickness | 5 μm |

The resultant thin film was cut together with the current collector into a size of 25 mm×25 mm, and a negative electrode A was thus prepared.

Preparation of Negative Electrode B

On the same current collector as that used for the negative electrode A, an amorphous Si—Co alloy thin film was deposited by applying direct current pulses and high frequencies to an Si target and a Co target using a two-source sputtering system under the conditions set forth in Table 2, and an electrode was thus prepared.

TABLE 2

| Si target | DC pulse frequency | 100 kHz |
| | DC pulse width | 1856 ns |
| | DC pulse power | 2000 W |
| Co target | High frequency power | 400 W |
| | Applied power frequency | 13.56 MHz |
| Argon flow rate | | 50 sccm |
| Gas pressure | | $1.7\text{-}2.2 \times 10^{-1}$ Pa |
| Formation duration | | 172 minutes |
| Film thickness | | 6.5 μm |

The Co concentration of the alloy thin film thus prepared was measured by X-ray fluorescence analysis. The result was 30 weight %.

The resultant Si—Co thin film was cut together with the current collector into a size of 25 mm×25 mm, and a negative electrode B was thus prepared.

Preparation of Positive Electrode A $Li_2Co_3$, $Co_3O_4$, $ZrO_2$ and MgO were mixed with a mortar so that the mole ratio of Li:Co:Zr:Mg became 1:0.99:0.005: 0.005. The mixture was heat-treated at 850° C. for 24 hours in an air atmosphere and thereafter pulverized, and thus a positive electrode active material was obtained having an average particle diameter of 13.9 μm and a BET specific surface area of 0.4 m²/g.

The positive electrode active material thus obtained, a carbon material as a conductive agent, and poly(vinylidene fluoride) as a binder were added at a weight ratio of 90:5:5 to N-methyl 2 pyrrolidone and then kneaded to prepare a positive electrode slurry.

The slurry prepared was coated on an aluminum foil as a current collector and dried, followed by rolling with reduction rollers. The resultant material was cut out into a size of 20 mm×20 mm and, thus, a positive electrode A was prepared.

Preparation of Positive Electrode B $Li_2Co_3$ and $CoCO_3$ were mixed with a mortar so that the mole ratio of Li:Co became 1:1. The mixture was pressure-formed by pressing it with a die having a diameter of 17 mm, baked at 800° C. for 24 hours in the air, and thereafter pulverized. Thus, a positive electrode active material having an average particle diameter of 20 μm was obtained.

The positive electrode active material thus obtained, a carbon material as a conductive agent, and poly(vinylidene fluoride) as a binder were added at a weight ratio of 90:5:5 to N-methyl-2-pyrrolidone and then kneaded to prepare a positive electrode slurry.

The slurry prepared was coated on an aluminum foil as a current collector and dried, followed by rolling with reduction rollers. The resultant material was cut out into a size of 20 mm×20 mm and, thus, a positive electrode B was prepared.

Preparation of Electrolyte Solution A

In a carbon dioxide atmosphere, $LiPF_6$ was dissolved in a solvent in which ethylene carbonate (EC) and diethyl carbonate (DEC) were mixed at a volume ratio of 3:7 so that the concentration of $LiPF_6$ became 1 mole/liter. Further, carbon dioxide was dissolved into the resultant electrolyte solution by bubbling. An electrolyte solution A was thus prepared. The amount of carbon dioxide dissolved into the electrolyte solution was found to be 0.37 weight % by gravimetric analysis.

Preparation of Electrolyte Solution B

In an argon atmosphere, $LiPF_6$ was dissolved in a solvent in which ethylene carbonate (EC) and diethyl carbonate (DEC) were mixed at a volume ratio of 3:7 so that the concentration of $LiPF_6$ became 1 mole/liter. An electrolyte solution B was thus prepared.

Preparation of Battery

The above-described positive electrodes A and B, the negative electrodes A and B, as well as the electrolyte solutions A and B were used in the combinations set forth in Table 3 to fabricate batteries A1 to A3 and B1 to B3. Each of the batteries was fabricated in the following manner.

A positive electrode current collector tab and a negative electrode current collector tab were attached to a positive electrode and a negative electrode, respectively, and thereafter, a separator made of a porous polyethylene was interposed between the positive electrode and negative electrode to form an electrode assembly. This electrode assembly was then inserted into an outer case made of an aluminum laminate. Next, a 600 μL electrolyte solution was filled therein. Thus, each of the batteries was fabricated. The design capacity of each of the batteries was 14 mAh.

Evaluation of Charge-Discharge Performance

Charge-discharge cycle performance was evaluated for each of the above-described batteries. Each battery was charged at a current of 14 mA to 4.2 V at 25° C. and then discharged at a current of 14 mA to 2.75 V. This process was defined as 1 charge-discharge cycle. The capacity retention ratios after cycle 100 and after cycle 300 of the batteries are shown in Table 3. Each of the capacity retention ratios was obtained with the maximum discharge capacity of each battery taken as 100%.

TABLE 3

| Battery | Positive electrode | Negative electrode | Electrolyte solution | Capacity retention ratio (%) After cycle 100 | Capacity retention ratio (%) After cycle 300 |
|---|---|---|---|---|---|
| A1 | A | A (Si) | B | 16.2 | 4.8 |
| A2 | A | A (Si) | A ($CO_2$ dissolved) | 86.8 | 48.5 |
| A3 | A | B (Si—Co) | A ($CO_2$ dissolved) | 92.0 | 81.8 |
| B1 | B | A (Si) | B | 14.4 | 1.4 |
| B2 | B | A (Si) | A ($CO_2$ dissolved) | 84.5 | 33.9 |
| B3 | B | B (Si—Co) | A ($CO_2$ dissolved) | 90.1 | 77.9 |

A comparison between battery A1 and battery B1 clearly demonstrates that the use of the positive electrode A according to the present invention improved the charge-discharge cycle performance as compared with the case in which the conventional positive electrode B was used. It is believed that by using the positive electrode active material according to the present invention adverse effects on the positive electrode active material that were caused by the reaction product formed on the negative electrode surface were reduced and consequently the charge-discharge cycle performance was improved. In the case of using a silicon thin film as the negative electrode active material, as the charge-discharge cycles proceeds, new cracks develop therein and columnar structures form. Therefore, the surface area that comes into contact with the electrolyte solution increases. Thus, the reaction product increases accordingly, enlarging adverse effects on the positive electrode side. It is believed that the difference appeared clearly in long cycles for this reason.

In addition, a comparison between the battery A2 and the battery B2 demonstrates that the above-noted advantageous effect was observed more remarkably when carbon dioxide was dissolved into the electrolyte solution.

Moreover, a comparison between the battery A1 and the battery A2 demonstrates that, by dissolving carbon dioxide into the electrolyte solution, the charge-discharge cycle performance improved dramatically. This is believed to be because a coating film of a benign reaction product originating from carbon dioxide was formed on the surfaces of the columnar structures in the negative electrode. It is believed that such a coating film can help to prevent the reaction product on the negative electrode surface from causing adverse effects through the electrolyte solution on the positive electrode side and help to prevent the positive electrode from degrading.

In addition, a comparison between the battery A2 and the battery A3 demonstrates that the battery A3 exhibited remarkable improvement in the charge-discharge cycle performance. It is believed that by using Si—Co alloy, in which not only Si but also cobalt is added, the performance of the negative electrode active material was improved, and moreover the advantageous effect of reducing degradation of the positive electrode further was enhanced.

Although a Si—Co alloy is used as a silicon alloy in the foregoing examples, similar advantageous effects can be obtained with the use of Si—Fe alloy, Si—Zn alloy, Si—Zr alloy or the like.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. A lithium secondary battery comprising: a negative electrode containing a negative electrode active material which is a Si—Co alloy provided on a surface of a current collector, a positive electrode containing a positive electrode active material, and a non-aqueous electrolyte, said positive electrode active material being a lithium transition metal oxide containing Li and Co and having a layered structure, and further containing Zr and Mg, and carbon dioxide being dissolved in said non-aqueous electrolyte.

2. The lithium secondary battery according to claim 1, wherein the total amount of Zr and Mg relative to the total amount of Zr, Mg and transition metal in the lithium transition metal oxide is 0.5-3.0 mole %.

3. The lithium secondary battery according to claim 2, wherein the molar ratio of Zr to Mg is 0.82-1.2.

4. The lithium secondary battery according to claim 1, wherein said Zr and Mg are contained in said metal oxide in substantially equimolar amounts.

5. The lithium secondary battery according to claim 1, wherein said negative electrode is formed by depositing a thin film of said Si—Co alloy on the surface of the current collector.

6. The lithium secondary battery according to claim 1, wherein said thin film is divided into columnar structures by gaps formed along its thickness, and bottom portions of the columnar structures are in contact with the current collector.

7. The lithium secondary battery according to claim 6, wherein the gaps are formed by expansion and shrinkage of the thin film.

8. The lithium secondary battery according to claim 1, wherein the current collector surface has an arithmetical mean roughness Ra of 0.1-10 μm.

9. The lithium secondary battery according to claim 1, wherein the current collector is a foil containing a heat-resistant copper alloy.

10. The lithium secondary battery according to claim 1, wherein said negative electrode active material is a thin film formed by CVD, sputtering, evaporation, thermal spraying, or plating.

11. The lithium secondary battery according to claim 1, wherein said negative electrode active material is amorphous or microcrystalline.

12. The lithium secondary battery according to claim 1, wherein said non-aqueous electrolyte contains, as its solvent, a mixed solvent comprising at least two or more kinds of solvents.

13. The lithium secondary battery according to claim 12, wherein said mixed solvent is a mixed solvent containing a cyclic carbonate and a chain carbonate.

14. The lithium secondary battery according to claim 13, wherein said cyclic carbonate includes ethylene carbonate.

* * * * *